United States Patent
Stack et al.

(10) Patent No.: US 9,863,356 B2
(45) Date of Patent: Jan. 9, 2018

(54) FUEL RAIL PRESSURE SENSOR DIAGNOSTIC TECHNIQUES

(71) Applicants: Robert Stack, Grand Blanc, MI (US); Jonathan D Stoffer, Rochester Hills, MI (US)

(72) Inventors: Robert Stack, Grand Blanc, MI (US); Jonathan D Stoffer, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 11 days.

(21) Appl. No.: 15/193,897

(22) Filed: Jun. 27, 2016

(65) Prior Publication Data

US 2016/0305358 A1 Oct. 20, 2016

Related U.S. Application Data

(62) Division of application No. 14/101,966, filed on Dec. 10, 2013, now Pat. No. 9,394,845.

(51) Int. Cl.
| | |
|---|---|
| F02D 41/22 | (2006.01) |
| F02M 65/00 | (2006.01) |
| F02D 41/12 | (2006.01) |
| F02D 41/26 | (2006.01) |
| G01M 15/09 | (2006.01) |

(52) U.S. Cl.
CPC ......... *F02D 41/222* (2013.01); *F02D 41/123* (2013.01); *F02D 41/26* (2013.01); *F02M 65/003* (2013.01); *G01M 15/09* (2013.01); *F02D 2041/223* (2013.01); *F02D 2041/228* (2013.01); *F02D 2200/0602* (2013.01)

(58) Field of Classification Search
CPC ......... F02D 2041/223; F02D 2041/228; F02D 2200/0602; F02D 41/123; F02D 41/222; F02D 41/12; F02M 65/003
USPC ........................ 701/103, 104, 110, 112, 114; 123/179.16, 179.17, 445, 446, 447, 456, 123/457, 478, 480, 481, 494, 497, 511, 123/325, 326, 198 F; 73/1.57, 114.43
See application file for complete search history.

(56) References Cited

U.S. PATENT DOCUMENTS

| | | |
|---|---|---|
| 5,554,801 A | 9/1996 | Watanabe |
| 5,727,516 A | 3/1998 | Augustin |
| 6,053,147 A | 4/2000 | Hemmerlein |
| 6,283,108 B1 | 9/2001 | Matsufuji |
| 6,389,901 B1 | 5/2002 | Joos |
| 7,121,265 B2 | 10/2006 | Joos |
| 7,832,375 B2 | 11/2010 | Dusa et al. |
| 7,854,160 B2 | 12/2010 | Elkolaly |
| 7,980,120 B2 | 7/2011 | Cinpinski |
| 7,987,704 B2 | 8/2011 | Lucido |
| 8,091,532 B2 | 1/2012 | Wang |

(Continued)

*Primary Examiner* — Erick Solis
*Assistant Examiner* — Carl Staubach
(74) *Attorney, Agent, or Firm* — Ralph E. Smith

(57) ABSTRACT

A first computer-implemented diagnostic method can run in response to an imminent deceleration fuel cutoff (DFCO) event. A second computer-implemented diagnostic method can run on engine shutdown. Both diagnostic methods involve controlling fuel injectors and a fuel pump to make the fuel rail pressure change from a desired minimum to a desired maximum. Measurements from the fuel rail pressure sensor at these endpoints can then be used to detect a fault of the fuel rail pressure sensor. One or both diagnostic methods can be implemented.

7 Claims, 4 Drawing Sheets

(56) References Cited

U.S. PATENT DOCUMENTS

| | | |
|---|---|---|
| 8,215,288 B2 | 7/2012 | Gwidt et al. |
| 8,220,322 B2 | 7/2012 | Wang et al. |
| 9,376,977 B2 * | 6/2016 | Methil-Sudhakaran F02D 41/1401 |
| 9,394,845 B2 * | 7/2016 | Stack .................... F02D 41/222 |
| 2001/0025626 A1 | 10/2001 | Antonioli |
| 2005/0263146 A1 | 12/2005 | Oono |
| 2006/0054149 A1 | 3/2006 | Uchiyama |
| 2006/0142931 A1 | 6/2006 | Cho |
| 2009/0112491 A1 | 4/2009 | Nakada |
| 2010/0224169 A1 | 9/2010 | Cinpinski |
| 2010/0275679 A1 | 11/2010 | Wang |
| 2011/0022290 A1 | 1/2011 | Kaneko |
| 2012/0203422 A1 | 8/2012 | Suda |
| 2012/0245824 A1 | 9/2012 | Miura |
| 2012/0255521 A1 | 10/2012 | Aoki |
| 2013/0080032 A1 | 3/2013 | Hirotaka |
| 2013/0125862 A1 | 5/2013 | Sahashi |

* cited by examiner

FUEL RAIL PRESSURE SENSOR DIAGNOSTIC TECHNIQUES

CROSS-REFERENCE TO RELATED APPLICATIONS

This application is a divisional of U.S. Ser. No. 14/101,966, filed Dec. 10, 2013.

FIELD

The present disclosure relates generally to internal combustion engines and, more particularly, to fuel rail pressure sensor diagnostic techniques.

BACKGROUND

Internal combustion engines can combust an air/fuel mixture within cylinders to drive pistons that rotatably turn a crankshaft to generate drive torque. A fuel system for the engine can include a fuel tank, one or more fuel pumps, a fuel rail, fuel injectors, and a fuel rail pressure sensor. The one or more fuel pumps can pump fuel from the fuel tank into the fuel rail. The fuel in the fuel rail can be pressurized for fast injection into the engine. The fuel injectors can be connected to the fuel rail and can periodically open thereby injecting the pressurized fuel into the engine. The fuel rail pressure sensor can measure the pressure of the fuel in the fuel rail and a controller can control operation of the fuel system based the measured fuel rail pressure. An inaccurate fuel rail pressure sensor, therefore, can result in increased emissions due to excess or insufficient fuel being injected into the engine.

SUMMARY

In one form, a method is provided in accordance with the teachings of the present disclosure. The method can include detecting, at a controller for an engine, the controller having one or more processors, an upcoming deceleration fuel cutoff (DFCO) event. The method can include executing, by the controller, a first diagnostic routine for a fuel fail pressure sensor in response to detecting the upcoming DFCO event. The first diagnostic routine can include deactivating the fuel pump, commanding fuel injectors to inject fuel into the engine to decrease a pressure in a fuel rail to a desired minimum pressure, receiving a first measured fuel rail pressure from the fuel rail pressure sensor, deactivating the fuel injectors, reactivating the fuel pump, commanding the fuel pump to supply fuel to the fuel rail to increase the fuel rail pressure to a desired maximum pressure, receiving a second measured fuel rail pressure from the fuel rail pressure sensor, and detecting a fault of the fuel rail pressure sensor based on a pressure difference between the second and first measured fuel rail pressures.

In another form, a method is provided in accordance with the teachings of the present disclosure. The method can include detecting, at a controller of an engine, the controller having one or more processors, an engine off event. The method can also include executing, by the controller, a first diagnostic routine for a fuel rail pressure sensor in response to detecting the engine off event. The first diagnostic routine can include deactivating fuel injectors of the engine, commanding a fuel pump of the engine to supply fuel to a fuel rail to increase the fuel rail pressure to the desired maximum pressure, deactivating the fuel pump, receiving a first measured fuel rail pressure from the fuel rail pressure sensor, reactivating the fuel injectors, commanding the fuel injectors to inject fuel into the engine to decrease the fuel rail pressure to the desired minimum pressure, deactivating the fuel injectors, receiving a second measured fuel rail pressure from the fuel rail pressure sensor, and detecting a fault of the fuel rail pressure sensor based on a pressure difference between the first and second measured fuel rail pressures.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
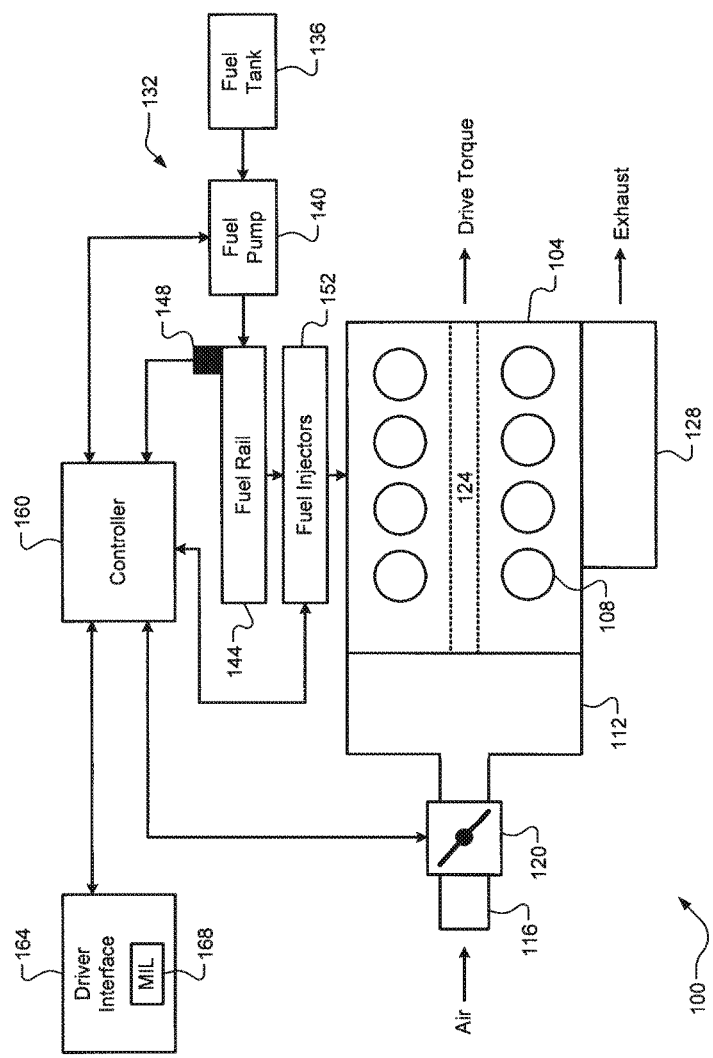
FIG. 1 is an example diagram of an engine system according to the principles of the present disclosure.

An inaccurate fuel rail pressure sensor can result in increased emissions due to excess or insufficient fuel being injected into the engine. Fuel rail pressure sensor diagnostics can be implemented to detect a fault of the fuel rail pressure sensor. A fault of the fuel rail pressure sensor can refer to the fuel rail pressure sensor being incapable of generating measurements in an acceptable range. For example only, the acceptable range for the fuel rail pressure sensor may be from a desired minimum fuel rail pressure to a desired maximum fuel rail pressure.

A fuel system for an engine, however, does not typically operate at these extreme fuel rail pressures. Some diagnostic systems actuate a pressure relief valve (PRV) of the fuel rail after to relieve the excess pressure from the diagnostic, but repeated actuation may cause the PRV to fail. Moreover, a diagnostic that frequently commands these extreme fuel rail pressures can adversely impact operation of a vehicle, e.g., by adjusting the drive torque generated by the engine, and can potentially affect the durability of the fuel system, such as the PRV.

Accordingly, fuel rail pressure diagnostic techniques are presented. The diagnostic techniques provide for accurate and robust detection of inaccurate or otherwise malfunctioning fuel rail pressure sensors. Moreover, the diagnostic techniques can be executed for variable pressure fuel systems, which can be used to increase fuel economy, as opposed to only static pressure fuel systems. Variable and static pressure can refer to a maximum operating pressure of the fuel system. The diagnostic techniques include a first diagnostic routine that can be run in response to upcoming, e.g., imminent, deceleration fuel cutoff (DFCO) events and a second diagnostic routine that can be run in response to an engine shutdown or engine off event.

Only one of the first and second diagnostic routines can be executed, or both of the diagnostic routines can be executed. In one implementation, both diagnostic routines are always executed. In another implementation, the second diagnostic routine is only executed when the first diagnostic routine is not executed during a vehicle trip, i.e., a suitable DFCO event never occurs. At least one of the first and second diagnostic routines can comply with a Federal Testing Procedure (FTP). An FTP may require that a sensor diagnostic is operable to run a requisite number of times (one or more) during a specific vehicle road test.

Because DFCO events typically occur a plurality of times during a typical vehicle trip, the first diagnostic routine can pass the FTP. To further improve the robustness of the diagnostic techniques, however, the second diagnostic routine can be performed on engine shutdown, which can guarantee that the fuel rail pressure sensor diagnostic runs during the vehicle road test specified by the FTP. As previously mentioned, the second diagnostic routine can be implemented either on its own, as always running in addition to the first diagnostic routine, or as a conditional diagnostic routine when the first diagnostic routine does not run during a vehicle trip.

The first diagnostic routine can include deactivating a fuel pump and bleeding down fuel rail pressure to a desired minimum pressure by commanding a specific number of fuel injections during the DFCO event. The fuel injectors can be deactivated, the fuel pump can be reactivated, and the fuel pump can be commanded to increase the fuel rail pressure to a desired maximum pressure. The fuel rail pressure sensor can measure the fuel rail pressures at both the desired minimum and maximum pressures. The measured pressure difference can then be compared to a threshold to detect a potential fault of the fuel rail pressure sensor.

The second diagnostic routine, on the other hand, can include deactivating the fuel injectors and commanding the fuel pump to increase the fuel rail pressure to the desired maximum pressure. The fuel pump can be deactivated and the fuel injectors can be reactivated and commanded to bleed down the fuel rail pressure to the desired minimum pressure. The fuel rail pressure sensor can measure the fuel rail pressure at both the desired minimum and maximum pressures. The measured pressure difference can then be compared to a threshold to detect a fault of the fuel rail pressure sensor.

It should be appreciated that instead of measuring minimum and maximum (endpoint) fuel rail pressures in order to detect a fault of the fuel rail pressure sensor, the techniques of the present disclosure can alternatively calculate a change in fuel rail pressure and determine an accumulative fuel rail pressure change. This can also be referred to as a "delta pressure." The techniques can then compare this delta pressure to a threshold to detect a fault of the fuel rail pressure sensor.

Referring now to FIG. 1, an example diagram of an engine system 100 is illustrated. The engine system 100 can include an internal combustion engine 104 (hereinafter "engine 104"). The engine 104 can be any suitable engine equipped with a variable pressure fuel system. Examples of the engine 104 include a spark ignition (SI) engine, such as direct injection (DI) engine or a port fuel injection (PFI) engine (also known as a sequential fuel injection, or SFI engine), and a non-SI engine, such as a diesel engine. The engine 104 can include a plurality of cylinders 108 (hereinafter "cylinders 108"). While eight cylinders are shown, it should be appreciated that the engine 104 can include other numbers of cylinders, e.g., four or six cylinders.

The engine 104 can draw air into an intake manifold 112 through an induction system 116 that can be regulated by a throttle 120. The air in the intake manifold 112 can be distributed to the cylinders 108 and combined with fuel to create the air/fuel mixture. The air/fuel mixture can be compressed and combusted within the cylinders 108 to drive pistons (not shown) that rotatably turn a crankshaft 124 to generate drive torque. The drive torque can then be transferred to a drivetrain (not shown) to propel a vehicle. Exhaust gas resulting from combustion can be expelled from the cylinders 108 into an exhaust system 128 that treats the exhaust gas before releasing it into the atmosphere.

A fuel system 132 can include a fuel tank 136, a fuel pump 140, a fuel rail 144, a fuel rail pressure sensor 148, and a plurality of fuel injectors 152 (hereinafter "fuel injectors 152"). In one implementation, the fuel system 132 can be a variable pressure fuel system. The fuel pump 140 can supply pressurized fuel from the fuel tank 136 to the fuel rail 144. For example, the fuel pump 152 may be a high pressure fuel pump. Additionally, the fuel system 132 may include two or more fuel pumps, e.g., a high pressure fuel pump and a low pressure fuel pump. The fuel rail pressure sensor 148 can be configured to measure a pressure of the fuel in the fuel rail 144 (a fuel rail pressure). The fuel rail pressure can depend on the type of the engine (DI, PFI, etc.). For example only, PFI engines may have fuel rail pressures from 200-700 kPa, whereas DI engines can have fuel rail pressures greater than 1 MPa.

The fuel injectors 152 can be periodically opened to inject fuel from the fuel rail 144 into the engine 104. The injection point of the fuel injectors 152 can also depend on the type of the engine 104 (DI, PFI, etc.). For example, in a DI engine the fuel injectors 152 can inject fuel directly into the cylinders 108, whereas in a PFI engine the fuel injectors 152 can inject fuel via intake ports of the cylinders 108. It should be appreciated that the fuel system 132 can include other suitable components, such as a fuel tank sensor and/or a PRV for the fuel rail 144. For example, the PRV for the fuel rail 144 could be actuated to decrease the fuel rail pressure in order to prevent damage to the fuel rail 144.

A controller 160 can control operation of the engine system 100. Specifically, the controller 160 can control the engine 104 to generate a desired torque in response to a torque request from a driver of the vehicle. The torque request can be based on input from the driver via a driver interface 164, e.g., an accelerator pedal. The driver interface 164 can further include a malfunction indicator lamp (MIL) 168 that can be actuated to notify the driver of a fault of a component of the engine system 100. For purposes of this disclosure, the MIL 168 can be associated with the fuel rail pressure sensor 148 and can be actuated when a fault of the fuel rail pressure sensor 148 is detected.

Figure 2:
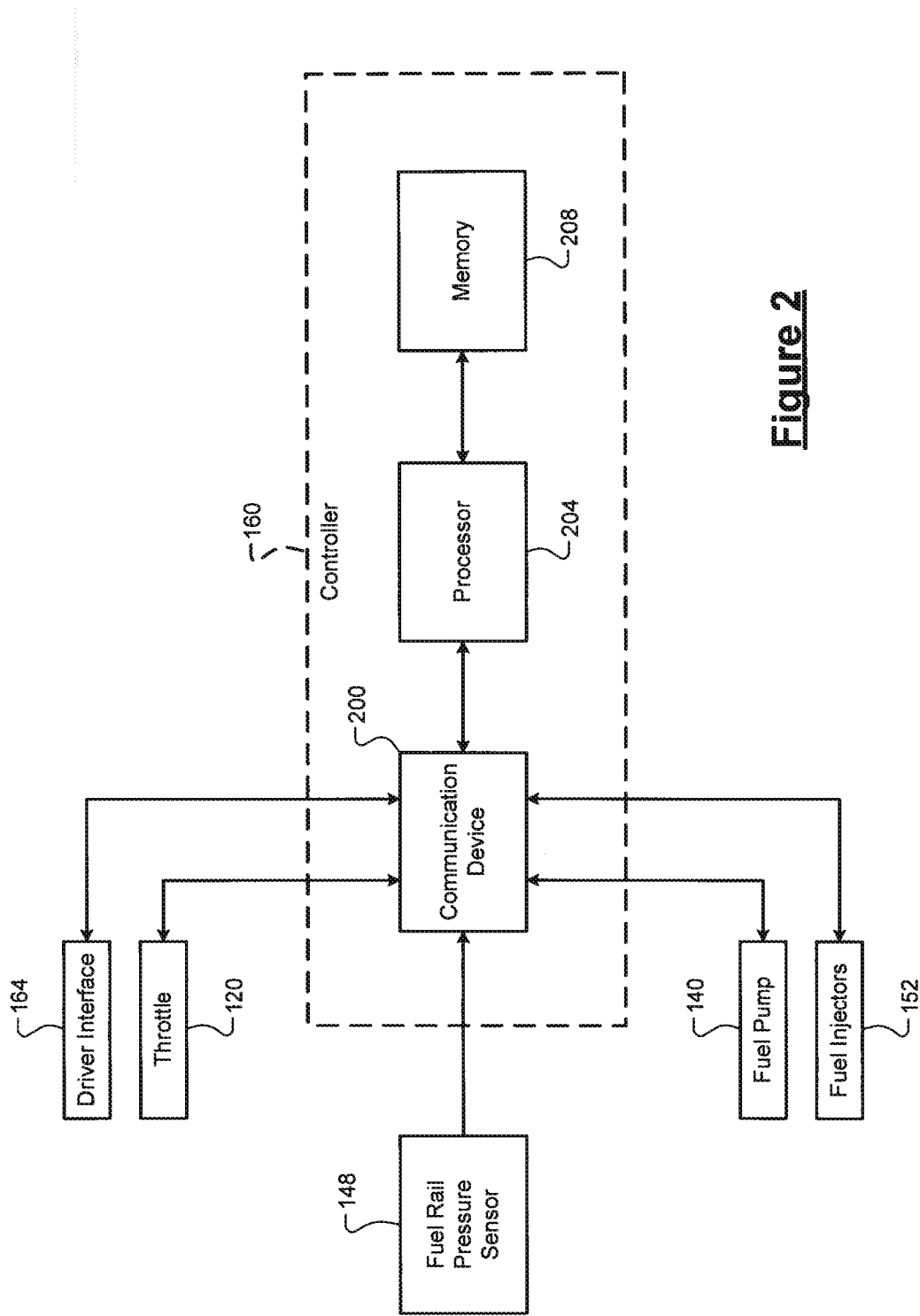
FIG. 2 is an example functional block diagram of a controller of the engine system according to the principles of the present disclosure.

Referring now to FIG. 2, an example functional block diagram of the controller 160 is illustrated. The controller 160 can include a communication device 200, a processor 204, and a memory 208. It should be appreciated that the term "processor" as used herein can refer to both a single processor and two or more processors operating in a parallel or distributed architecture. The memory 208 can be any suitable storage medium (hard disk, flash, etc.) configured to store information at the controller 160. For example, the memory 208 can store the predetermined threshold that indicates an appropriate pressure difference for the fuel rail pressure sensor 148 of the present disclosure, which is discussed in greater detail below.

The communication device 200 can include any suitable components, e.g., a transceiver, configured for communication with components of the engine system 100 via a controller area network (CAN) bus (the throttle 116, the fuel pump 140, the fuel rail pressure sensor 148, the fuel injectors 152, the driver interface 164, the MIL 168, etc.). It should be appreciated that the communication device 200 can also be configured to communicate with other components (a remote server, a mobile phone, another vehicle, etc.) via another network, such as a local area network (LAN), e.g., Bluetooth communication, or a wide area network (WAN), e.g., the Internet. The communication device 200 can generally be used to interface between the processor 204 and the components of the engine system 100.

The processor 204 can be configured to control operation of the controller 160. These functions can include, but are not limited to, loading/executing an operating system of the controller 160, controlling information sent via the communication device 200, processing information received via the communication device 200, and controlling read/write operations at the memory 208. The processor 204 can also wholly or partially execute the fuel rail pressure sensor diagnostic techniques of the present disclosure. This can include executing a set of instructions, e.g., stored at the memory 208. The specifics of the fuel rail pressure sensor diagnostic techniques are now described in greater detail.

The processor 204 can detect an imminent DFCO event. The term "imminent" can refer to the DFCO event being upcoming and thus occurring within a predetermined future period, e.g., a few seconds. It should be appreciated that the DFCO event can also be referred to as a deceleration fuel shutoff (DFSO) event. It should also be appreciated that the fuel rail pressure sensor diagnostic techniques of the present disclosure can be implemented during other periods where engine torque is not required. The processor 204 can detect the imminent DFCO event based on various operating parameters, which can be monitored via the communication device 200. When these operating parameters indicate that no engine torque is being requested, the processor 204 can detect the imminent DFCO event. For example, these operating parameters can include engine load and engine speed.

When the processor 204 detects the imminent DFCO event, the processor 204 can execute a non-obstructive diagnostic routine for the fuel rail pressure sensor 148. The term "non-obstructive" can refer to the diagnostic routine not affecting or otherwise being noticed during the driver's operation of the vehicle, e.g., by not altering the drive torque generated by the engine 104. The following diagnostic routine can be referred to as a first diagnostic routine, which occurs during DFCO events. The processor 204 can deactivate the fuel pump 140. Deactivating the fuel pump 140 can include disabling/shutting-off the fuel pump 140 or commanding the fuel pump 140 to deliver fuel at its minimum rate, e.g., for a high pressure fuel pump.

The processor 204 can then command the fuel injectors 152 to inject fuel into the engine 104 such that the fuel rail pressure decreases to a desired minimum pressure. This can also be referred to as "bleeding down" the fuel pressure in the fuel rail 144 to the desired minimum pressure. Specifically, the processor 204 can command the fuel injectors 152 to perform a specific number of fuel injections. This specific number of fuel injections can be calculated based on engine operating conditions leading into the DFCO event, e.g., engine speed. This control can be further refined based on other delay/reaction times (relays on/off, dynamic pressure transport time, etc.). As previously discussed, the desired minimum pressure can depend on the type of the engine 104. For example only, in an SFI engine the desired minimum pressure may be approximately 200 kPa.

After the fuel injectors 152 have been commanded to bleed down the fuel rail pressure to the desired minimum pressure, the processor 204 can receive a first measured fuel rail pressure from the fuel rail pressure sensor 148. The processor 204 can also deactivate the fuel injectors 152, either before or after receiving the first measured fuel rail pressure. The processor 204 can then reactive the fuel pump 140 and command the fuel pump to supply fuel to the fuel rail 144 to increase the fuel rail pressure to a desired maximum pressure. The processor 204 can command the fuel pump 140 to supply the fuel at a desired rate and, by knowing a volume of the fuel rail 144 and the desired minimum pressure, the processor 204 can determine a specific period for the fuel rail pressure to reach the desired maximum pressure. Again, as previously discussed, the desired maximum pressure can depend on the type of the engine 104. For example only, in an SFI engine the desired maximum pressure may be approximately 700 kPa and the specific period may be approximately 500 milliseconds.

The processor 204 can then receive a second measured fuel rail pressure from the fuel rail pressure sensor 148. The processor 204 can then calculate a pressure difference between the second and first measured fuel rail pressures. This can represent a measurable pressure range of the fuel rail pressure sensor 148. The processor 204 can then compare this pressure difference to a predetermined threshold. For example only, in an SFI engine where the desired minimum and maximum pressures are approximately 200 kPa and 700 kPa respectively, the pressure difference is approximately 500 kPa and the predetermined threshold can be approximately 300-350 kPa. The predetermined threshold can be stored at the memory 208 and can represent an appropriate pressure difference (measurable pressure range) for the fuel rail pressure sensor 148. When the pressure difference is less than this predetermined threshold, the processor 204 can detect a fault of the fuel rail pressure sensor 148. In one implementation, the processor 204 can further measure a response time of the fuel rail pressure sensor 148 to respond, e.g., a delay from activating the fuel pump 140 to the fuel rail pressure sensor 148 sensing the increased fuel rail pressure. When this response time is greater than a predetermined response threshold, the processor 204 can also detect a fault.

The processor 204 can generate a fault signal in response to detecting the fault. In one implementation, the processor 204 can implement a counter and can wait to generate the fault signal until the pressure difference has been less than the predetermined threshold for multiple diagnostic routines. This fault signal can indicate that the fuel rail pressure sensor 148 is inaccurate. Additionally or alternatively, the processor 204 can generate the fault signal or another fault signal when the response time is greater than the predetermined response threshold. In some cases, the fuel rail pressure sensor 148 may require repair or replacement.

The processor 204 can take additional action in response to detecting the fault. More specifically, the processor 204 can at least one of (i) actuate the MIL 168 to indicate the fault to the driver of the vehicle and (ii) adjust operation of the engine 104. Adjusting operation of the engine 104 can be utilized to prevent damage and/or increased emissions due to the inaccurate fuel rail pressure sensor 148. For example, adjusting engine operation can include commanding the throttle 116 to a predetermined position, which is also known as limp-home mode. Further, when the DFCO event ends, the processor 204 can adjust operation of the fuel injectors, e.g., decrease pulse widths, to compensate for the high pressure in the fuel rail 144.

The steps of the first diagnostic routine above can be executed sequentially. In other words, each step can be performed in response to completion of its previous step. For example, the processor 204 can deactivate the fuel pump 140 in response to detecting the imminent DFCO event. Some steps, such as measuring of the fuel rail pressures using the fuel rail pressure sensor 148, however, can occur at different times, e.g., before or at a same time as deactivating the fuel pump 140 or fuel injectors 152, depending on which fuel rail pressure measurement.

As previously discussed, an FTP may require that a sensor diagnostic is operable to run a requisite number of times (one or more) during a specific vehicle road test. Because DFCO events typically occur a plurality of times during a typical vehicle trip, the fuel rail pressure sensor diagnostic techniques described above can pass the FTP. To further improve the robustness of the fuel rail pressure sensor diagnostic, however, a second diagnostic routine can be performed on engine shutdown, which can guarantee that the fuel rail pressure sensor diagnostic runs during a vehicle trip that does not contain a sufficient DFCO event. This diagnostic routine can be used in addition to the diagnostic routine previously described herein or instead of the diagnostic routine previously described herein. For example, this diagnostic routine could be run when a DFCO event is not detected during a vehicle trip.

The processor 204 can detect an engine off event. The engine off event can represent the driver of the vehicle switching off the engine 104 (a key-off, a push button, etc.). For an engine off event, the engine speed can be expected to be idle or slightly higher than idle, but less than 1000 revolutions per minute (RPM). Similarly, the fuel rail pressure can be expected to be low, e.g., less than 300 kPa in a PFI engine. The processor 204 can deactivate the fuel injectors 152 and command the fuel pump 140 to increase the fuel rail pressure to the desired maximum pressure, e.g., ~700 kPa in a PFI engine. The processor 204 can receive a first measured fuel rail pressure from the fuel rail pressure sensor 148.

The processor 204 can then deactivate the fuel pump 140 and reactivate the fuel injectors 152. Specifically, the processor 204 can command the fuel injectors to perform a specific number of fuel injections to decrease the fuel rail pressure to the desired minimum pressure, e.g., ~200 kPa in a PFI engine. This specific number of fuel injections can be calculated based on the engine operating conditions entering the engine off event, which are different than engine operating conditions entering a DFCO event, e.g., a lower RPM. For example, the fuel injectors 152 can be commanded to inject fuel until the engine speed drops below a specific engine speed, e.g., 100 RPM.

The processor 204 can then deactivate the fuel injectors 152 and receive a second measured fuel rail pressure from the fuel rail pressure sensor 148. The processor 204 can calculate a pressure difference between the first measured fuel rail pressure and the second measured fuel rail pressure. Based on this pressure difference, the processor 204 can detect a fault of the fuel rail pressure sensor 148 based on the predetermined threshold as previously discussed herein. It should be appreciated, however, that the predetermined threshold can be different for this diagnostic routine than the previously discussed diagnostic routine.

As previously mentioned, the steps of the second diagnostic routine above can be executed sequentially. In other words, each step can be performed in response to completion of its previous step. For example, the processor 204 can deactivate the fuel injectors 152 in response to detecting the engine off event. Some steps, such as measuring of the fuel rail pressures using the fuel rail pressure sensor 148, however, can occur at different times, e.g., before or at a same time as deactivating the fuel pump 140 or fuel injectors 152, depending on which fuel rail pressure measurement.

Figure 3:
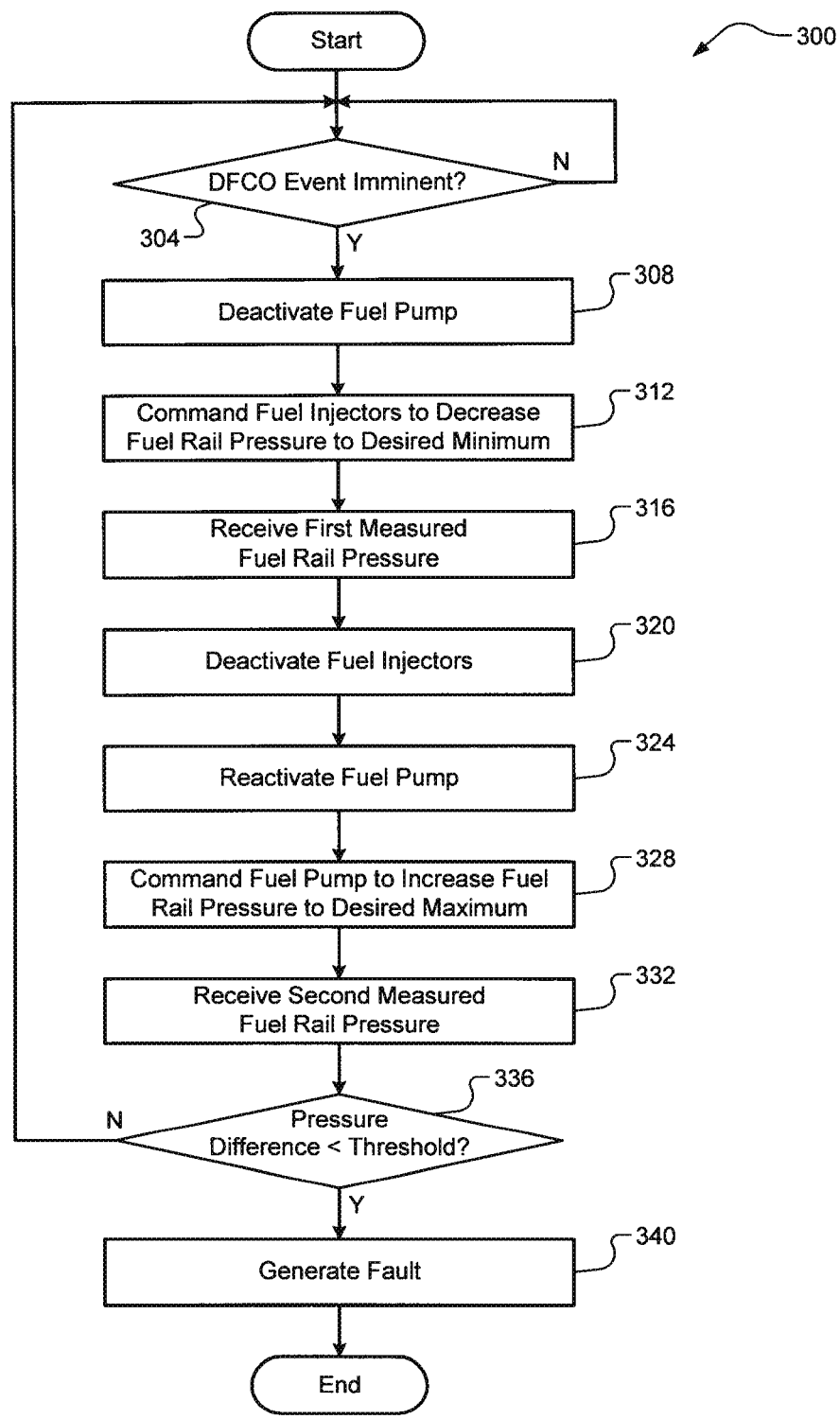
FIG. 3 is an example flow diagram of a fuel rail pressure sensor diagnostic method according to the principles of the present disclosure.

Referring now to FIG. 3, an example flow diagram of a fuel rail pressure sensor diagnostic method 300 including the first diagnostic routine is illustrated. At 304, the controller 160 can determine whether a DFCO event is imminent. If a DFCO event is imminent, the method 300 can proceed to 308. If a DFCO event is not imminent, the method 300 can end or return to 304 for one or more additional cycles. At 308, the controller 160 can deactivate the fuel pump 140. At 312, the controller 160 can command the fuel injectors 152 to inject fuel into the engine 104 to decrease the fuel rail pressure to a desired minimum pressure. At 316, the controller 160 can receive a first measured fuel rail pressure from the fuel rail pressure sensor 148. At 320, the controller 160 can deactivate the fuel injectors 152. At 324, the controller 160 can reactivate the fuel pump 140.

At 328, the controller 160 can command the fuel pump 140 to supply fuel to the fuel rail 144 to increase the fuel rail pressure to a desired maximum pressure. At 332, the controller 160 can receive a second measured fuel rail pressure from the fuel rail pressure sensor 148. At 336, the controller 160 can determine whether a pressure difference between the second and first measured fuel rail pressures is less than a predetermined threshold indicative of an appropriate pressure difference for the fuel rail pressure sensor 148. If false, the method 300 can end or return to 304 for one or more additional cycles. If true, the method 300 can proceed to 340 and generate a fault. Generating the fault may further include actuating the MIL 168 and/or adjusting engine operation, e.g., commanding a limp-home mode. The method 300 can then end.

Figure 4:
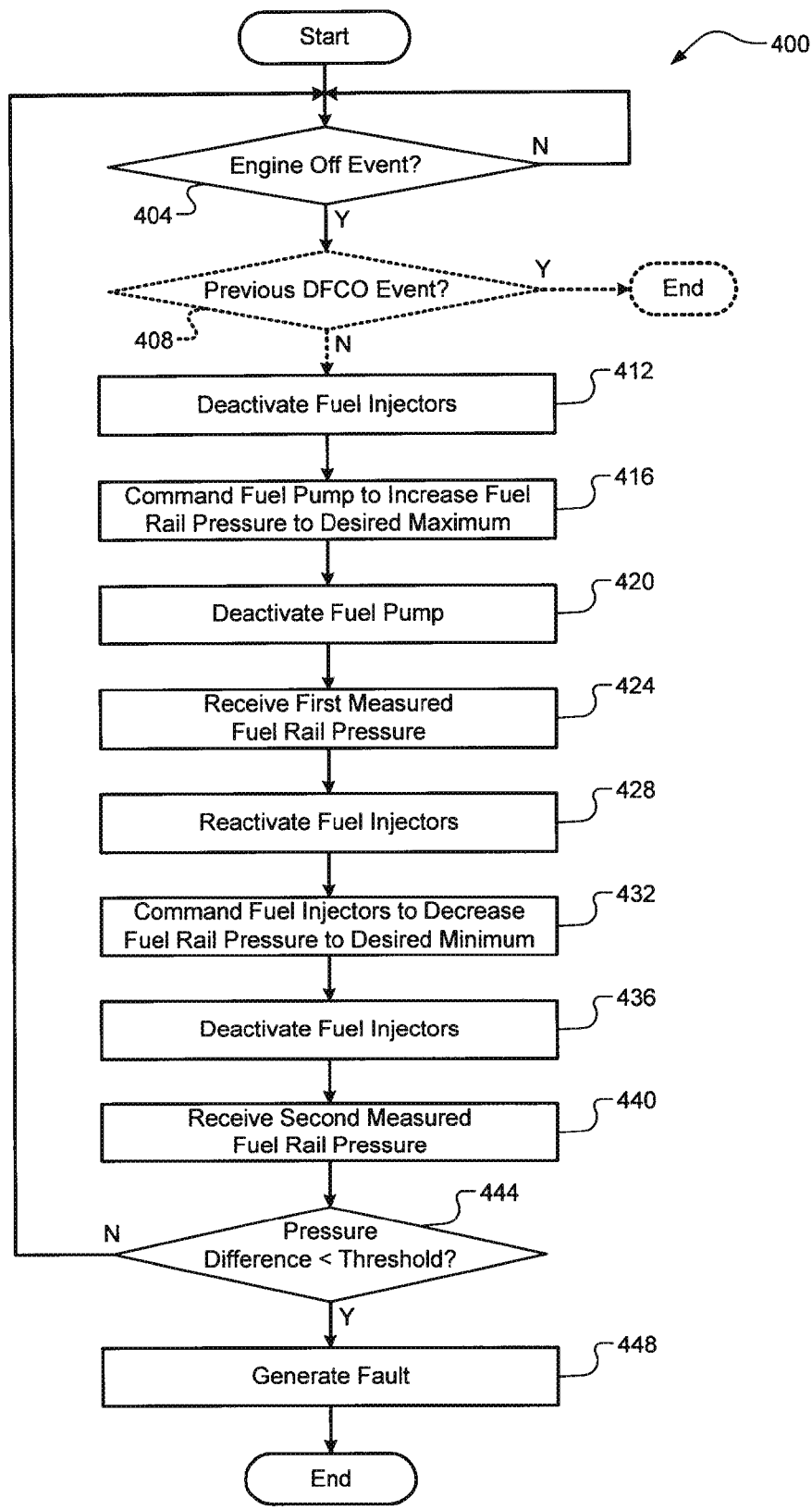
FIG. 4 is an example flow diagram of a fuel rail pressure sensor diagnostic method according to the principles of the present disclosure.

Referring now to FIG. 4, an example flow diagram of a fuel rail pressure sensor diagnostic method 400 including the second diagnostic routine is illustrated. At 404, the controller 160 detects whether an engine off event is occurring. If an engine off event is occurring, the method 400 can proceed to 408. If an engine off event is not occurring, the method 400 can end or return to 404 for one or more additional cycles. At 408, the controller 160 can determine whether at least one DFCO event previously occurred during the vehicle trip. If a previous DFCO event occurred, the method 400 can end. If a previous DFCO event did not occur, the method 400 can proceed to 412. It should be appreciated, however, that step 408 is optional and thus the method 400 can proceed from 404 to 412 in response to detecting an engine off event. In other words, the following diagnostic routine can run regardless of whether a DFCO event (and its corresponding diagnostic routine) previously occurred.

At 412, the controller 160 can deactivate the fuel injectors 152. At 416, the controller 160 can command the fuel pump 140 to increase the fuel rail pressure to the desired maximum pressure. At 420, the controller 160 can deactivate the fuel pump 140. At 424, the controller 160 can receive a first measured fuel rail pressure from the fuel rail pressure sensor 148. At 428, the controller 160 can reactivate the fuel injectors 152. At 432, the controller 160 can command the fuel injectors 152 to inject fuel into the engine 104 to decrease the fuel rail pressure to the desired minimum pressure. At 436, the controller 160 can deactivate the fuel injectors 152. At 440, the controller 160 can receive a second measured fuel rail pressure from the fuel rail pressure sensor 148.

At 444, the controller 160 can determine whether a pressure difference between the first and second measured pressures is less than a predetermined threshold. The predetermined threshold can be the same or different than the predetermined threshold used for the other diagnostic routine. If the pressure difference is greater than or equal to the predetermined threshold, the method 400 can end or return to 404 for one or more additional cycles. If the pressure difference is less than the predetermined threshold, the method 400 can proceed to 448. At 448, the controller 160 can generate a fault. Generating the fault may further include actuating the MIL 168 and/or adjusting engine operation, e.g., commanding a limp-home mode. The method 400 can then end.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
    detecting, at a controller of an engine, the controller having one or more processors, an engine off event; and
    executing, by the controller, a first diagnostic routine for a fuel rail pressure sensor in response to detecting the engine off event, the first diagnostic routine including:
        deactivating fuel injectors of the engine;
        commanding a fuel pump of the engine to supply fuel to a fuel rail to increase the fuel rail pressure to a desired maximum pressure;
        deactivating the fuel pump;
        receiving a first measured fuel rail pressure from the fuel rail pressure sensor;
        reactivating the fuel injectors;
        commanding the fuel injectors to inject fuel into the engine to decrease the fuel rail pressure to a desired minimum pressure;
        deactivating the fuel injectors;
        receiving a second measured fuel rail pressure from the fuel rail pressure sensor; and
        detecting a fault of the fuel rail pressure sensor based on a pressure difference between the first and second measured fuel rail pressures.

2. The method of claim 1, wherein the controller detects the fault of the fuel rail pressure sensor when the pressure difference between the first and second measured fuel rail pressures is less than a predetermined threshold indicative of an appropriate pressure difference for the fuel rail pressure sensor.

3. The method of claim 2, further comprising at least one of:
    actuating, by the controller, a malfunction indicator lamp in response to detecting the fault of the fuel rail pressure sensor; and
    adjusting, by the controller, operation of the engine in response to detecting the fault of the fuel rail pressure sensor.

4. The method of claim 1, further comprising executing, by the controller, a second diagnostic routine for the fuel rail pressure sensor in response to detecting an upcoming deceleration fuel cutoff (DFCO) event during a vehicle trip prior to the engine off event.

5. The method of claim 4, wherein the first diagnostic routine for the fuel rail pressure sensor is executed by the controller in response to the engine off event when a DFCO event is not detected during the vehicle trip.

6. The method of claim 4, wherein the second diagnostic routine includes:
    deactivating the fuel pump;
    commanding the fuel injectors to inject fuel into the engine to decrease the fuel rail pressure to the desired minimum pressure;
    receiving a third measured fuel rail pressure from the fuel rail pressure sensor;
    deactivating the fuel injectors;
    reactivating the fuel pump;
    commanding the fuel pump to supply fuel to the fuel rail to increase the fuel rail pressure to the desired maximum pressure;
    receiving a fourth measured fuel rail pressure from the fuel rail pressure sensor; and
    detecting a fault of the fuel rail pressure sensor based on a pressure difference between the fourth and third measured fuel rail pressures.

7. The method of claim 6, wherein the upcoming DFCO event is an imminent DFCO event, and wherein the controller detects the fault of the fuel rail pressure sensor when the pressure difference between the fourth and third measured fuel rail pressures is less than a predetermined threshold indicative of an appropriate pressure difference for the fuel rail pressure sensor.

* * * * *